(12) United States Patent
Peng (10) Patent No.: US 8,001,873 B2
(45) Date of Patent: Aug. 23, 2011

(54) UNIVERSAL JOINT CAPABLE OF REPLACING DIFFERENT TOOL SETS

(76) Inventor: Cheng Chia Peng, Taichung (TW)

( * ) Notice: Subject to any disclaimer, the term of this patent is extended or adjusted under 35 U.S.C. 154(b) by 178 days.

(21) Appl. No.: 12/535,609

(22) Filed: Aug. 4, 2009

(65) Prior Publication Data

US 2011/0030517 A1 Feb. 10, 2011

(51) Int. Cl.
*B25B 1/00* (2006.01)
*F16D 3/10* (2006.01)
(52) U.S. Cl. ........................ 81/177.75; 403/57; 464/120
(58) Field of Classification Search ............. 081/177.75, 081/177.85, 436; 403/57, 74, 114, 367, 122; 464/106, 115, 120, 108
See application file for complete search history.

(56) References Cited

U.S. PATENT DOCUMENTS

| 3,098,365 | A | * | 7/1963 | Pearson | 464/120 |
| 4,114,401 | A | * | 9/1978 | Van Hoose | 81/177.75 |
| 4,941,862 | A | * | 7/1990 | Hazebrook et al. | 81/177.75 |
| 5,974,919 | A | * | 11/1999 | Habele | 81/177.85 |
| 2009/0288523 | A1 | * | 11/2009 | Chen | 81/177.85 |

* cited by examiner

*Primary Examiner* — Hadi Shakeri (57) ABSTRACT

A universal joint comprises a tool set including a driving portion secured on one end thereof and a spherical member fixed on another end thereof; a base including a receiving chamber disposed on one end thereof and a circular groove mounted on another end thereof to receive the spherical member of the tool set, between the groove and the spherical member of the tool set being defined a stooping structure, the stopping structure including two opposite sliding slots and two locking tabs relative to the sliding slots, and a locking structure disposed on the base and including two annular recesses arranged on an outer periphery of the base and communicating with the groove to receive two engaging members respectively, on an outer periphery of the base being fitted a pressing member in which an abutting surface formed therein.

7 Claims, 11 Drawing Sheets

UNIVERSAL JOINT CAPABLE OF REPLACING DIFFERENT TOOL SETS

BACKGROUND OF THE INVENTION

1. Field of the Invention

The present invention relates to a universal joint that only single base is used to cooperate with different tool sets, lowering production cost and the number of the base, and carrying conveniently.

2. Description of the Prior

Figure 1:
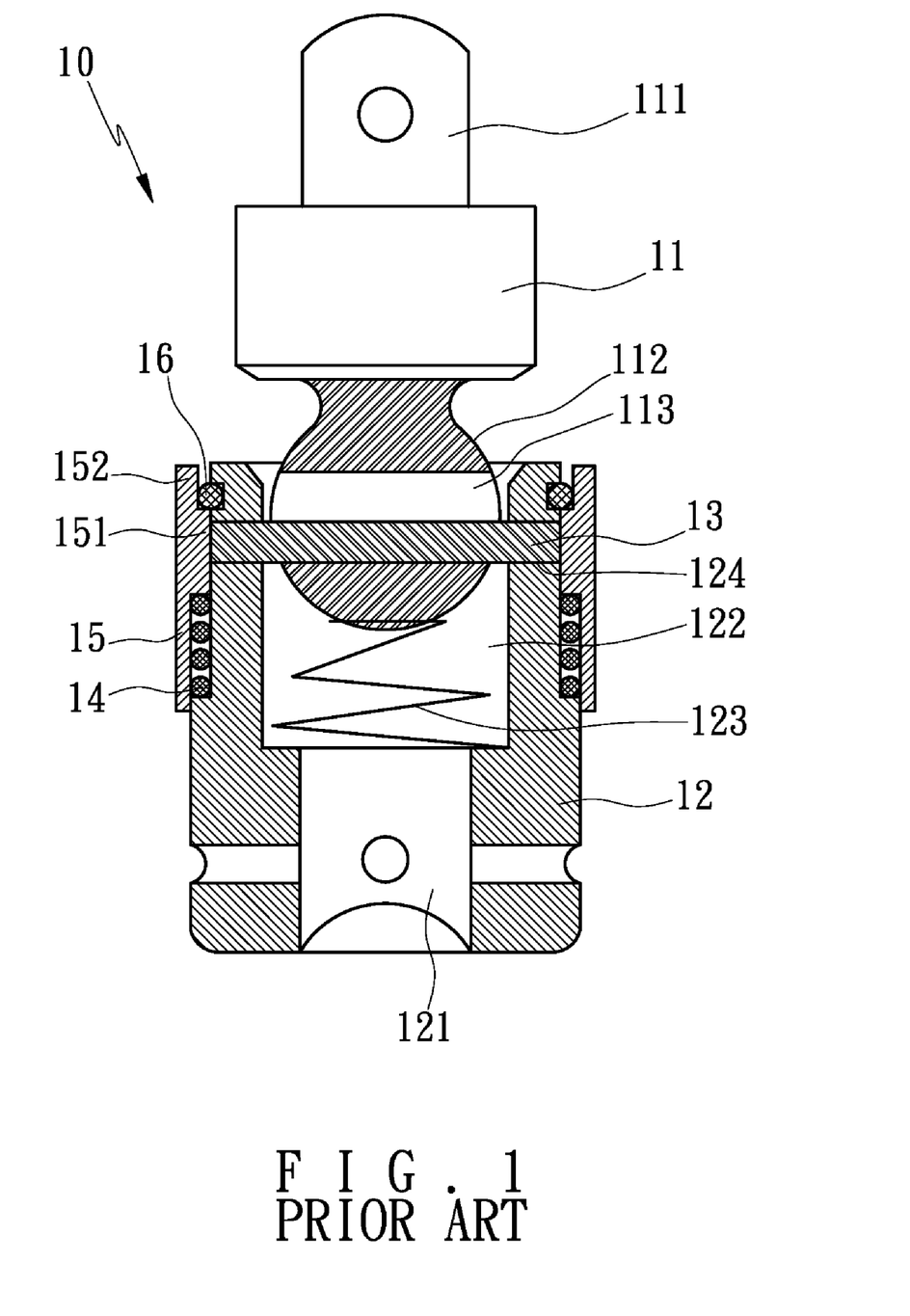
FIG. 1 is a cross sectional view showing the assembly of a conventional universal joint of TW Pat. No. 87218189.
Figure 2:
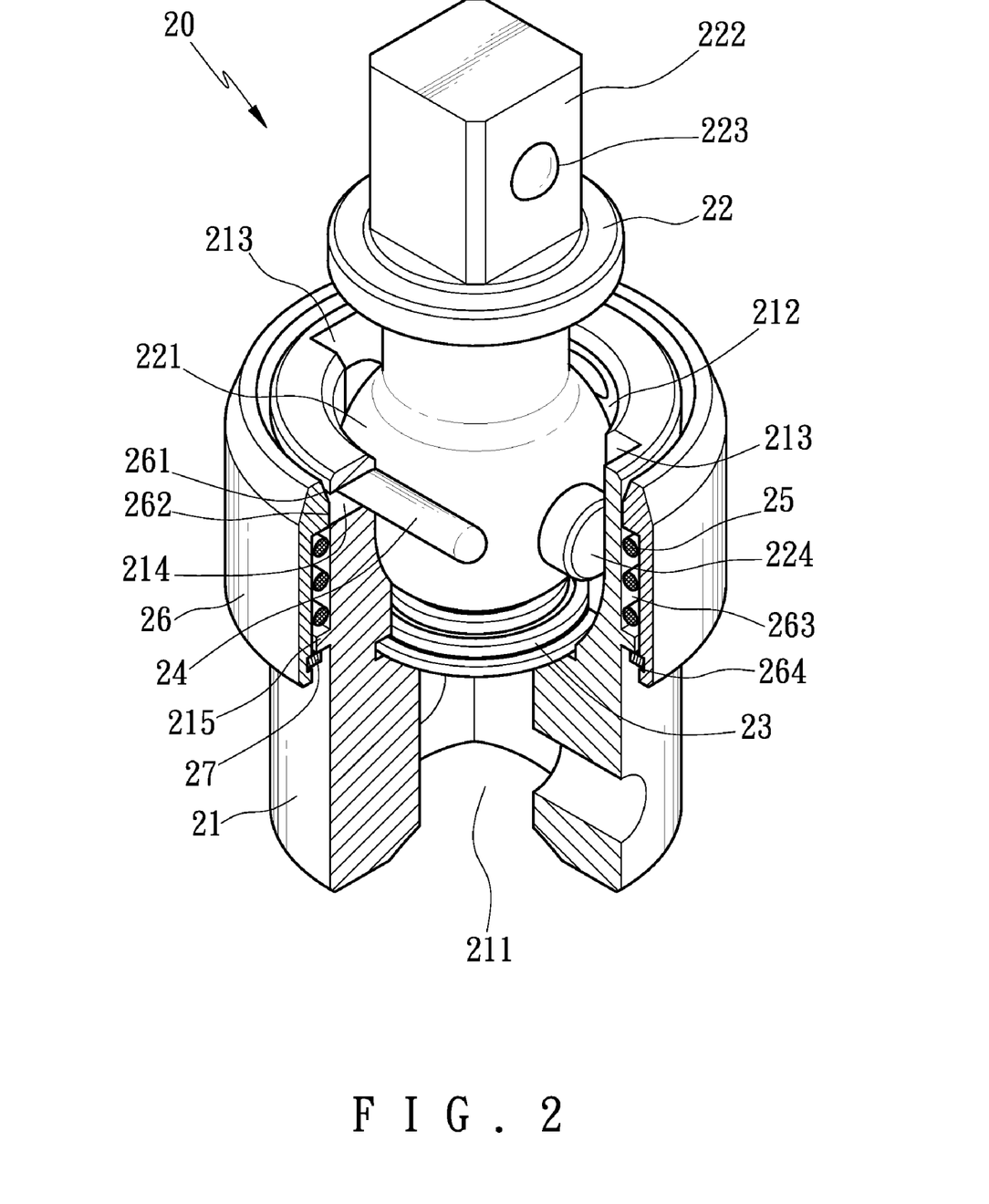
FIG. 2 is a perspective view showing the assembly of a universal joint in accordance with a preferred embodiment of the present invention.
Figure 3:
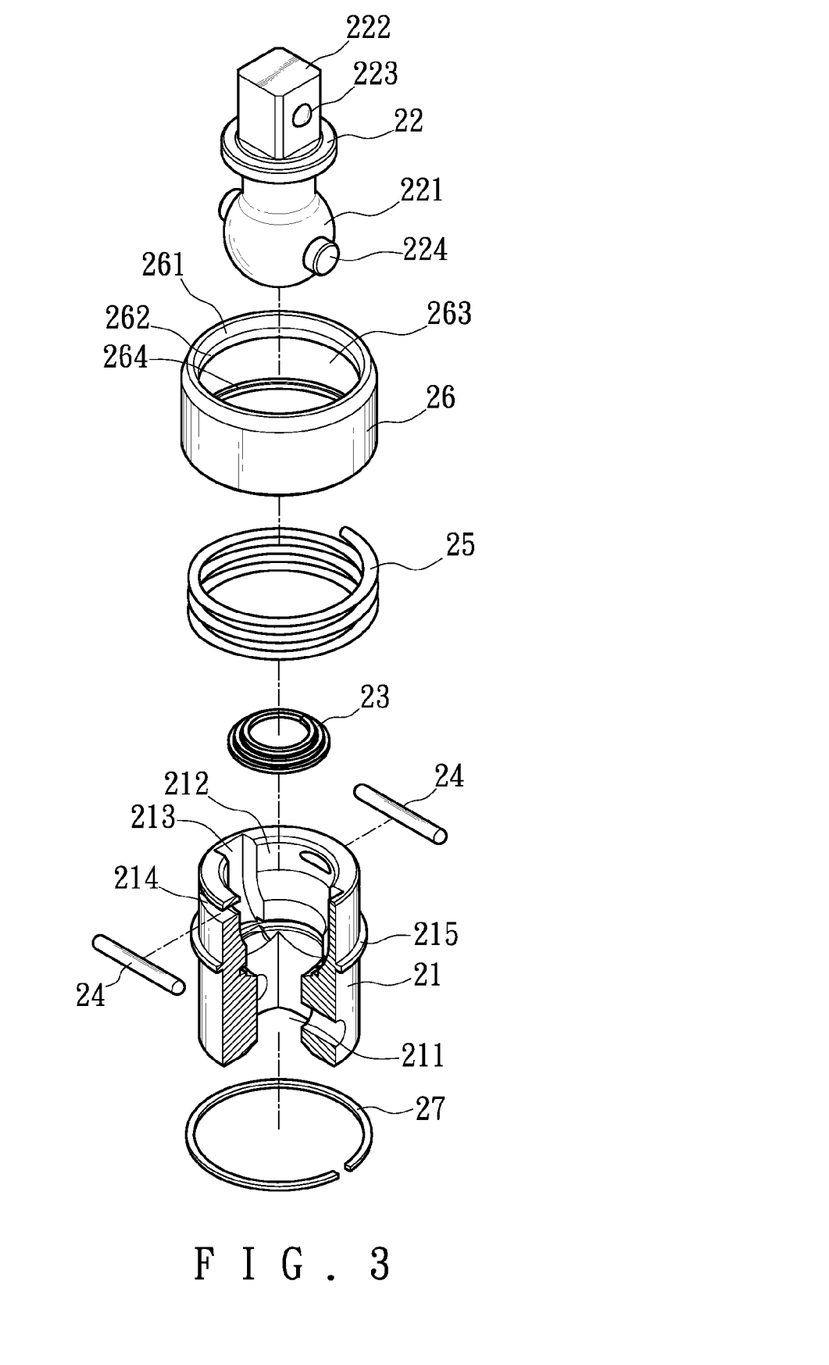
FIG. 3 is a perspective view showing the exploded components of the universal joint in accordance with the preferred embodiment of the present invention.
Figure 4:
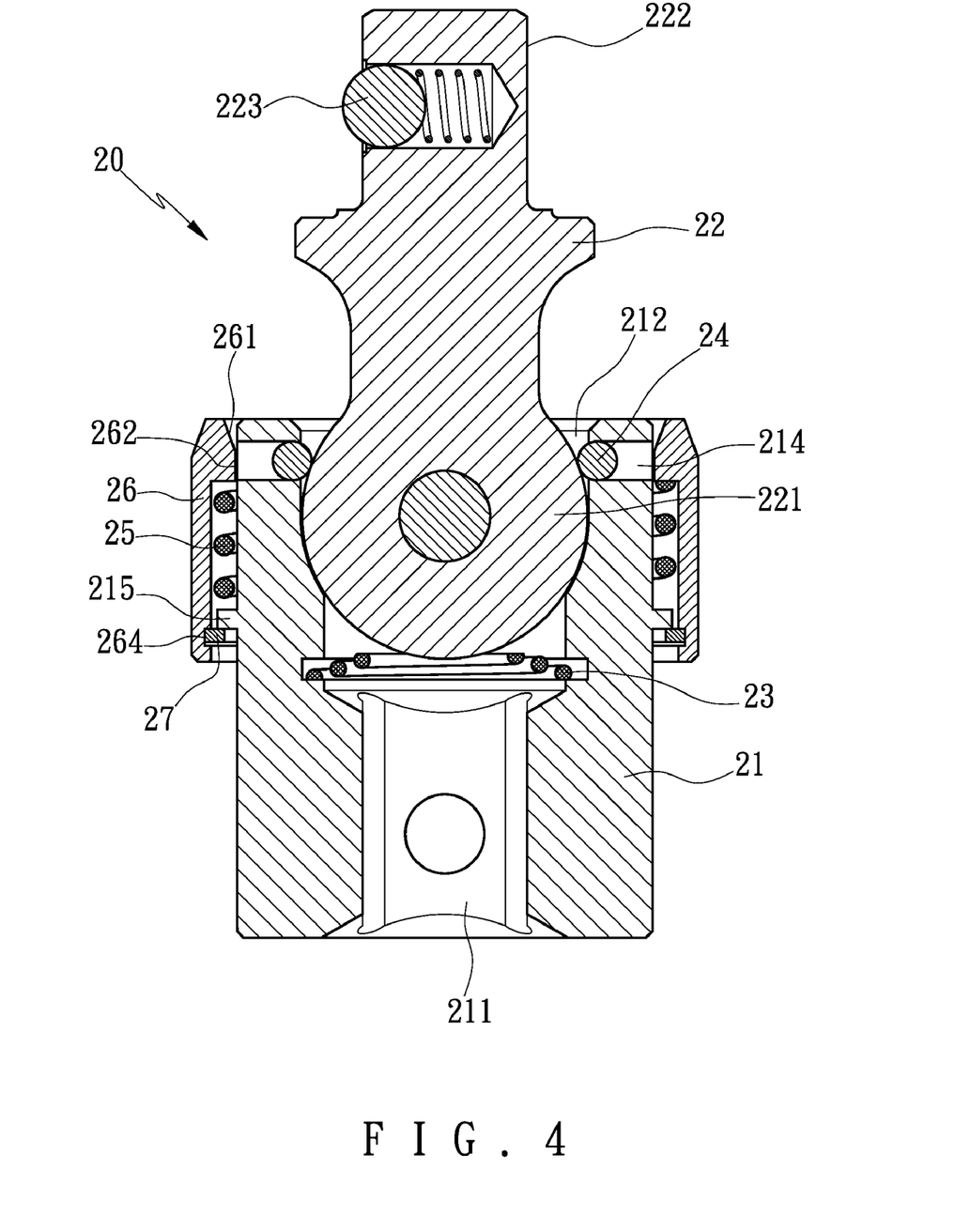
FIG. 4 is a cross sectional view showing the assembly of the universal joint in accordance with the preferred embodiment of the present invention.
Figure 5:
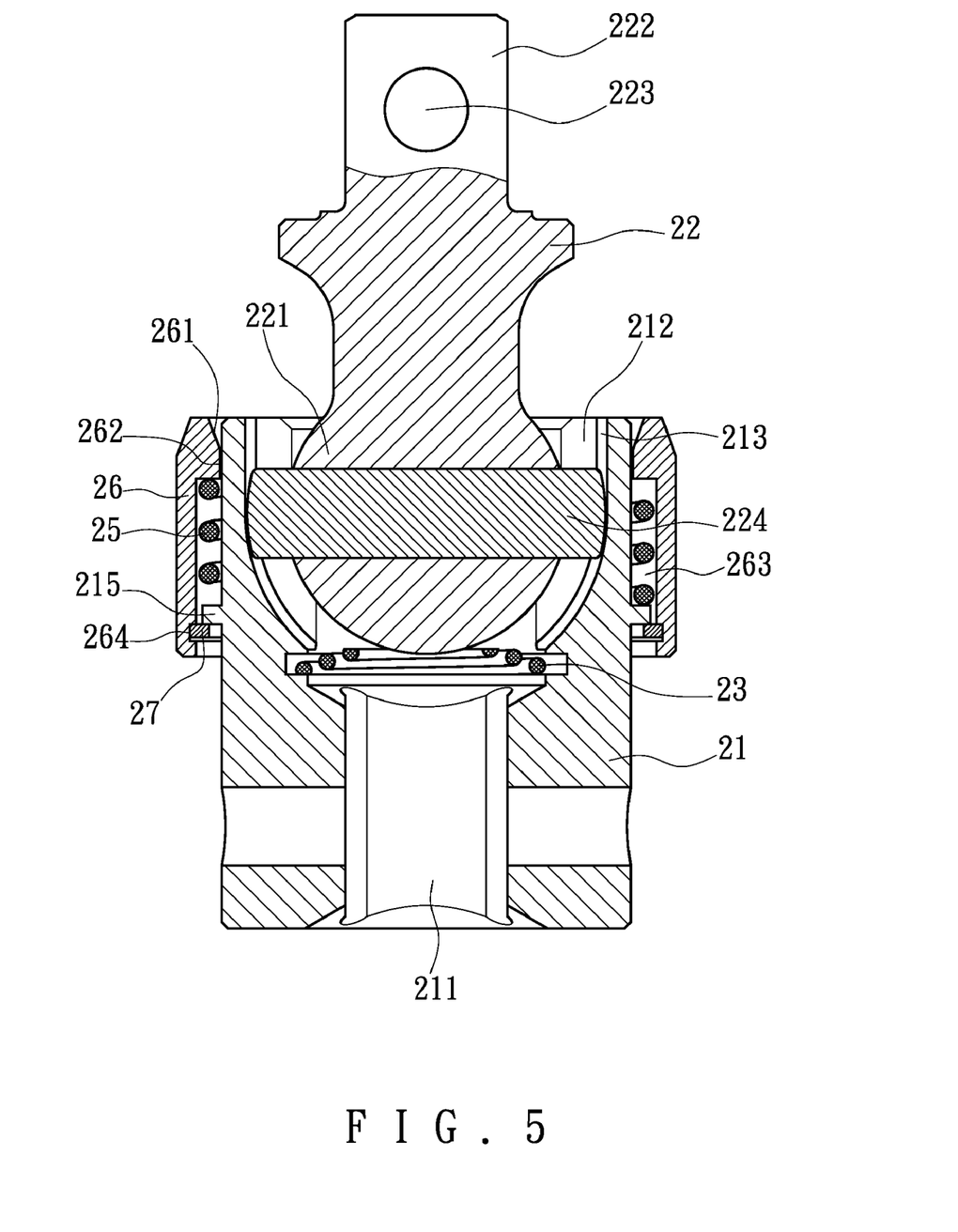
FIG. 5 is another cross sectional view showing the assembly of the universal joint in accordance with the preferred embodiment of the present invention.
Figure 6:
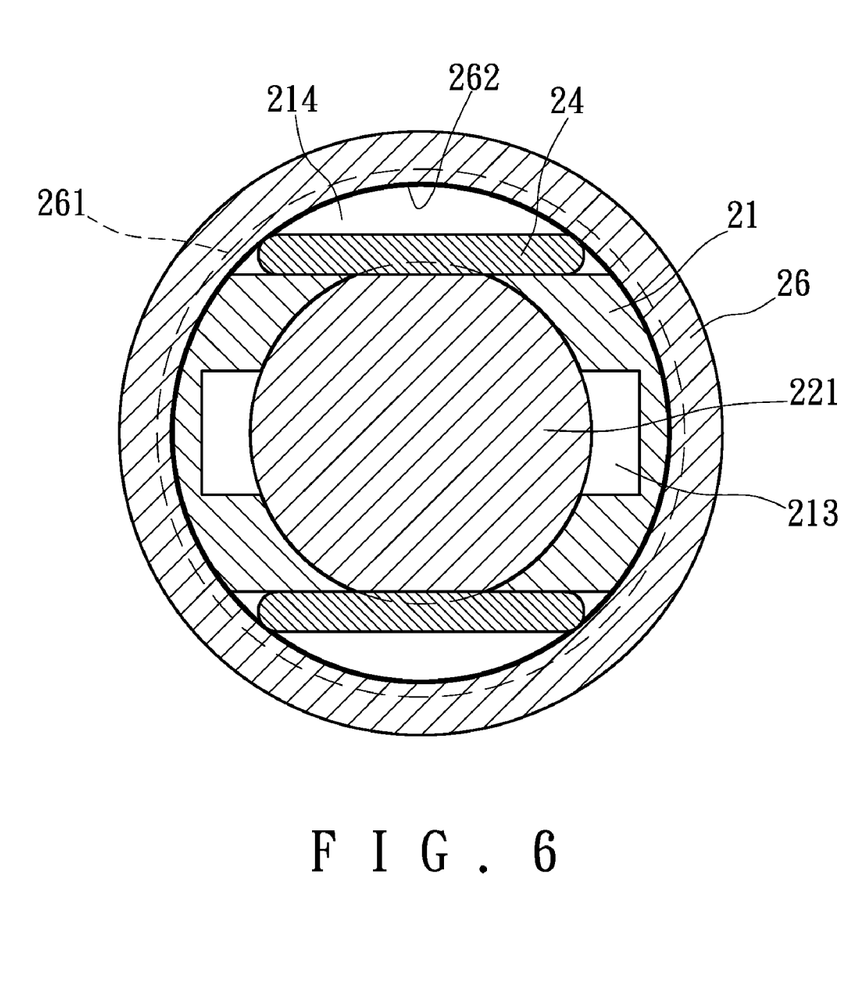
FIG. 6 is a cross sectional view showing the part of FIG. 5.

Referring to FIG. 1, a conventional universal joint 10 disclosed in TW Patent No. 87218189 includes a tool set 11 and a base 12, the tool set 11 includes a polygonal driving portion disposed on one end thereof and having a steel ball, and includes a spherical member 112 with a through hole 113 mounted on another end thereof. The base 12 includes a polygonal receiving chamber 121 formed on one end thereof to fit a hand tool or an air tool, and includes a groove 122 to receive a first spring 123 fixed on another end thereof, and includes two opposite bores 124 communicating with the groove 122. The spherical member 112 of the tool set 11 is placed in the groove 112 of the base 12, and a positioning pin 13 is inserted through the bores 124 of the base 12 and the through hole 113 of the tool set 11, such that the tool set 11 is assemble to the base. The base 12 also includes a second spring 14 fitted thereon and an annular loop 15 with a protrusion 151. The annular loop 15 includes a covering rib 152 located above the protrusion 151, and a C-shaped retainer 16 is retained on the base 16 to locate on a side of the covering rib 152 so as to prevent the annular loop 15 from disengagement from the base 12, however, however such a conventional universal joint has the following disadvantages:

1. The spherical member 112 of the tool set 11 is locate in the groove 122 of the base 12 by using the positioning pin 13, therefore as the tool set 11 is damaged, it can not be replaced solely.

2. The base 12 is used to match with a certain size and type of tool set 11, accordingly different bases 12 have to be made to cooperate with their corresponding tool sets, increasing production cost and carrying inconveniently.

The present invention has arisen to mitigate and/or obviate the afore-described disadvantages.

SUMMARY OF THE INVENTION

The primary object of the present invention is to provide a universal joint that only single base is used to cooperate with different tool sets, lowering production cost and the number of the base, and carrying conveniently.

Another object of the present invention is to provide a universal joint that can replace the base or the tool sets easily.

A universal joint according to a preferred embodiment of the present invention comprises:

a tool set including a driving portion secured on one end thereof and a spherical member fixed on another end thereof;

a base including a receiving chamber disposed on one end thereof and a circular groove mounted on another end thereof to receive the spherical member of the tool set, between the groove and the spherical member of the tool set being defined a stooping structure, the stopping structure including two opposite sliding slots and two locking tabs relative to the sliding slots, and a locking structure disposed on the base and including two annular recesses communicating with the groove to receive two engaging members respectively, on an outer periphery of the base being fitted a pressing member in which an abutting surface formed therein;

wherein the groove of the base includes a first spring received therein;

wherein the sliding slots of the stopping structure are formed on an inner peripheral wall of the groove of the base, and the locking tabs are attached on the spherical member of the tool set;

wherein the engaging member is formed in a shaft shape;

wherein the annular recesses are arranged on the outer periphery of the base to receive the engaging members, and each recess includes an engaging member placed therein;

wherein the locking structure also includes a peripheral rib disposed on the outer periphery of the base, and includes a second spring fitted on the base, and on one end of the pressing member are provided an inner conical surface and an abutting surface, on another end of the pressing member is mounted a holding space, and an inner wall of the holding space contacts with one end of the second spring;

wherein on an inner wall of the holding space of the pressing member is mounted a cutout to receive a C-shaped retainer.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Referring to FIGS. 2-6, a universal joint 20 according to a preferment embodiment of the present invention comprises:

a base 21 and a tool set 22, the base 21 including a polygonally hollow receiving chamber 211 disposed on one end thereof and a circular groove 212 mounted on another end thereof, the groove 212 including a first spring 23 received therein, and the tool set 22 including a spherical member 221 fixed on one end thereof and including a driving portion in different size and type secured on another end thereof. In this embodiment, the driving portion of the tool set 22 is formed in a quadrangle cylinder shape and includes a coupling stem 222 having a steel ball 223 attached therein to fit a sleeve, the spherical member 221 of the tool set 22 is placed in the groove 212 of the base 21 and the coupling stem 222 extends out of the base 21, wherein the joint 20 includes a stooping structure defined between the groove 212 of the base 21 and the spherical member 221 of the tool set 22, such that the base 21 drives the tool set 22 to rotate simultaneously. The stopping structure includes two opposite sliding slots 213 formed on an inner peripheral wall of the groove 212 of the base 21, and includes two locking tabs 224 relative to the sliding slots 213 of the base 21 attached on the spherical member 221 of the tool set 22 so that the locking tabs 224 slidably move and engage in the sliding slots 213 of the base 21, such that the base 21 can actuate the tool set 22 to rotate simultaneously. In addition, the joint 20 includes a locking structure disposed on the base 21 to control the replacement of the tool set 22.

The locking structure includes two annular recesses 214 arranged on an outer periphery of the base 21 and communicating with the groove 212, and each recess 214 includes an engaging member 24 placed therein and formed in a shaft shape, the locking structure also includes a peripheral rib 215 disposed on the outer periphery of the base 21, and includes a second spring 25 and a pressing member 26 fitted on the base 21, wherein one end of the second spring 25 abuts against the peripheral rib 215, and on one end of the pressing member 26 are provided an inner conical surface 261 and an abutting surface 262, on another end of the pressing member 26 is mounted a holding space 263 in which a cutout 264 is fixed. The pressing member 26 is fitted to the second spring 25 and an inner wall of the holding space 263 contacts with another end of the second spring 25, the cutout 264 includes a C-shaped retainer 27 retained under the peripheral rib 215 of the base 21 to prevent the pressing member 26 from disengagement from the base 21 and to move the pressing member 26 in an axial direction, such that the abutting surface 262 of the pressing member 26 is biased against two ends of the engaging members 24 to push the engaging members 24 to displace inward, and a central portion of the engaging members 24 extends out of the groove 212 and engages with an upper end of the spherical member 221 of the tool set 22, assembling the tool set 22 on the base 21.

Figure 7:
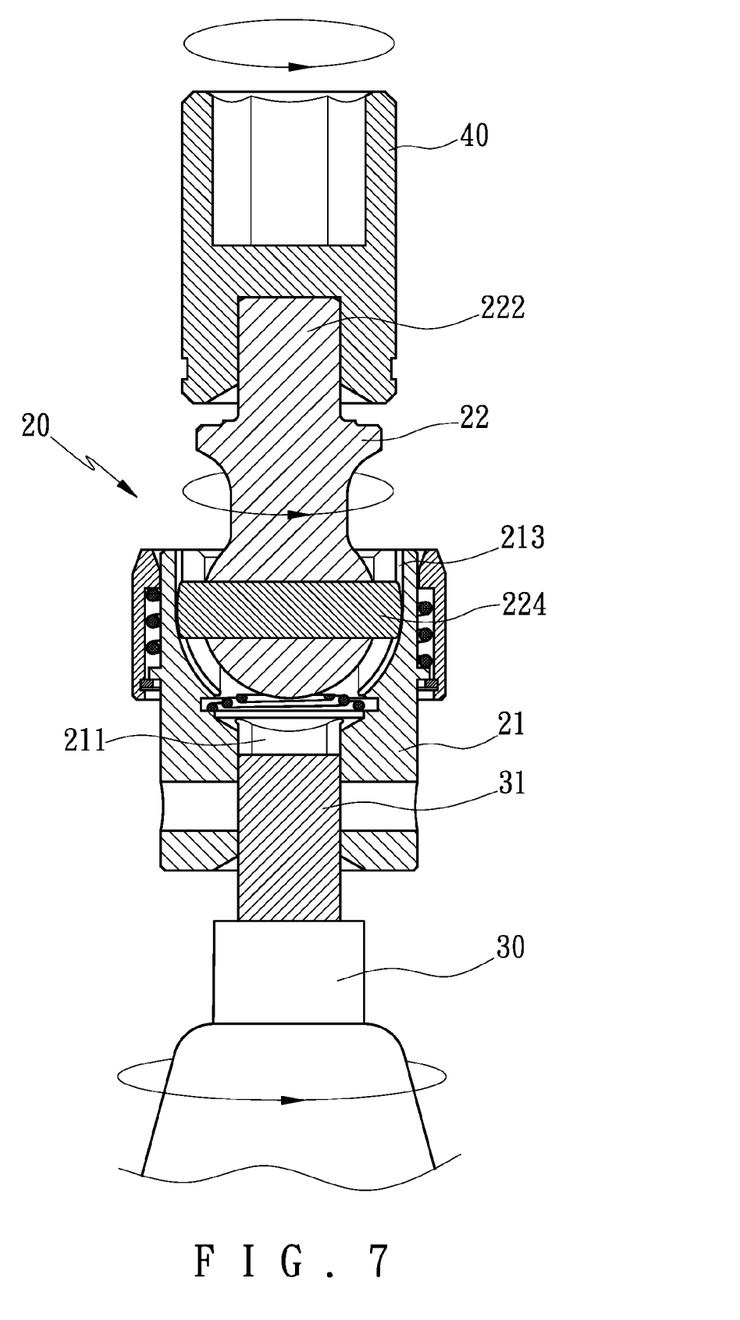
FIG. 7 is a cross sectional view showing a base and a tool set rotating simultaneously.

In operation, as shown in FIG. 7, the universal joint 20 drives a fitting shank 31 of a driving tool 30 (such as an air tool) by using the receiving chamber 211 of the base 21, and the coupling stem 222 of the tool set 22 engages with a sleeve 40. As the fitting shank 31 of the driving tool 30 rotates, it actuates the base 21 of the universal joint 20 to rotate. Due to the sliding slots 213 of the base 21 engage with the locking tabs 224 of the tool set 22, the base 21 pushes the locking tabs 224 of the tool set 22 by ways of the sliding slots 213 so as to rotate the tool set 22 simultaneously, such that sleeve 40 is rotated by the tool set 22 to fasten and unfasten bolt elements.

Figure 8:
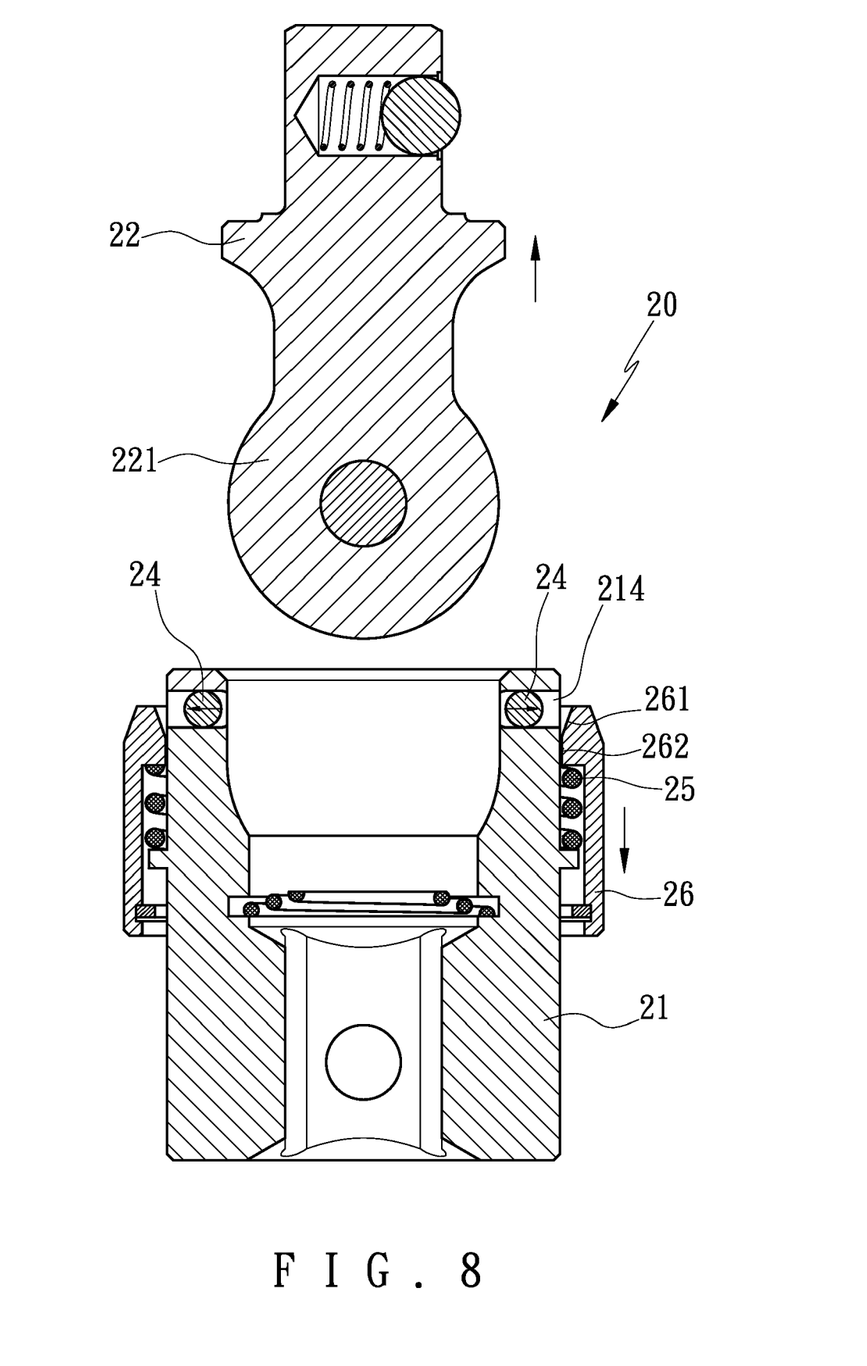
FIG. 8 is a cross sectional view showing the operation of the universal joint in accordance with the preferred embodiment of the present invention.
Figure 9:
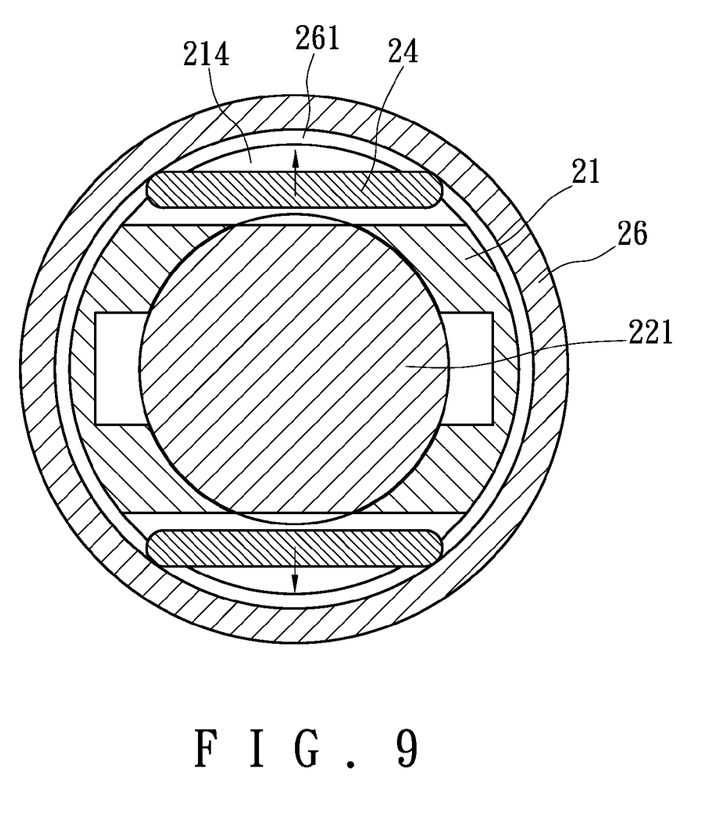
FIG. 9 is another cross sectional view showing the operation of the universal joint in accordance with the preferred embodiment of the present invention.
Figure 10:
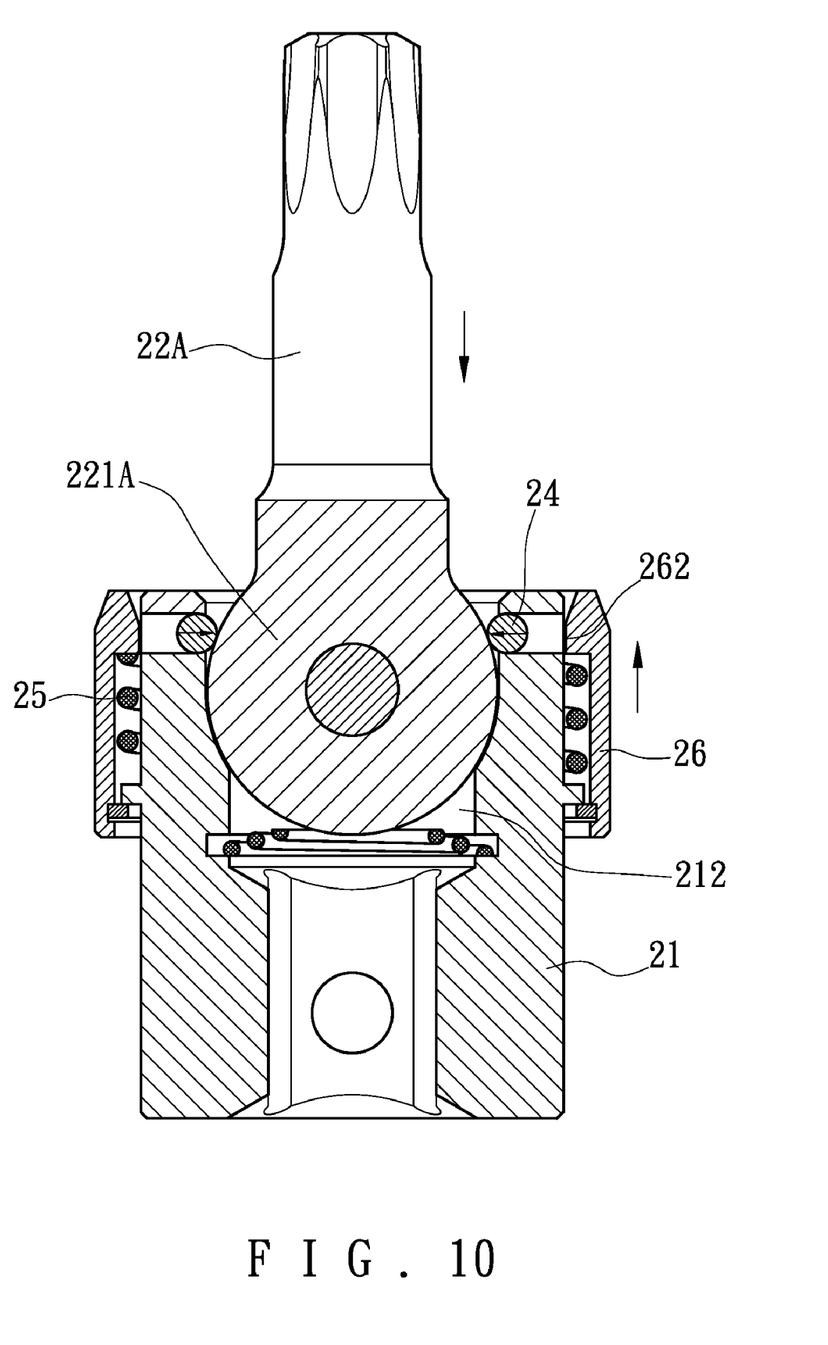
FIG. 10 is also anther cross sectional view showing the operation of the universal joint in accordance with the preferred embodiment of the present invention.

As illustrated in FIGS. 8 and 9, in replacement of the tool set 22 form the base 21, the pressing member 26 is pressed to compress the second spring 25 to displace downward so that the abutting surface 262 disengages from the two ends of the engaging members 24, therefore the conical surface 261 of the pressing member 26 is located on a side of the annular recess 214 of the base 21 to form a disengagement space to remove the engaging members 24, and the tool set 22 is removed upward to push the engaging members 24 to move outward by using the spherical member 221, thus releasing the engagement of the spherical member 221 to disengage the tool set 22 from the base 21. With reference further to FIG. 10, the tool set is replaced as requirement, and a spherical member 221A of the tool set 22A is placed in the groove 212 of the base 21, then the pressing member 26 is released to move upward by using the second spring 25 so that the abutting surface 262 pushes the engaging members 24 to move inward again, hence the engaging members 24 retain on an upper end of the spherical member 221A of the tool set 22A. Thereafter, the tool set 22A is assembled to the base 21.

Figure 11:
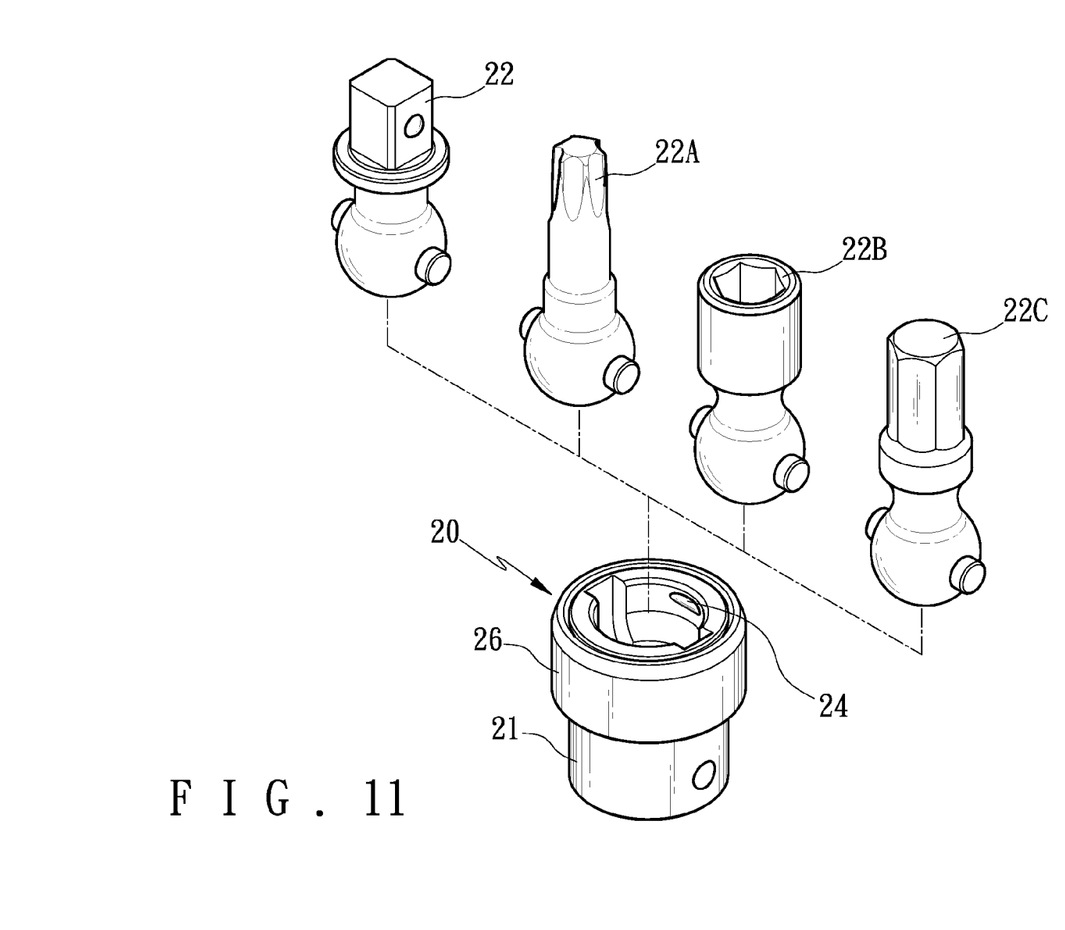
FIG. 11 is a cross sectional view showing the base of the present invention cooperating with different tool sets.

Referring to FIGS. 8 and 11, the base 21 and the tool set 22 are designed in a separating manner, therefore the signal base 21 can cooperate with different type of driving portions of the tool sets, such as a tool set 22A with a driving portion to drive a screw driver head, a tool set 22B with a driving portion to drive a sleeve, or a tool set 22C with a driving portion to drive a hex key wrench. As replacing different tool sets 22, 22A, 22B, 22C, the pressing member 26 is pressed downward to release the engaging members 24 so that the engaging members 24 move outward to place desired tool set. Accordingly, only single base 21 is used to cooperate with different tool sets, lowering production cost and the number of the base.

While we have shown and described various embodiments in accordance with the present invention, it is clear to those skilled in the art that further embodiments may be made without departing from the scope of the present invention.

What is claimed is:

1. A universal joint comprising:
  a tool set including a driving portion secured on one end thereof and a spherical member fixed on another end thereof;
  a base including a receiving chamber disposed on one end thereof and a circular groove mounted on another end thereof to receive the spherical member of the tool set, between the groove and the spherical member of the tool set being defined a stooping structure, the stopping structure including two opposite sliding slots and two locking tabs relative to the sliding slots, and a locking structure disposed on the base and including two annular recesses communicating with the groove to receive two engaging members respectively, on an outer periphery of the base being fitted a pressing member in which an abutting surface formed therein;
  wherein on one end of the pressing member are provided an inner conical surface and the abutting surface;
  wherein the abutting surface of the pressing member is biased against the engaging members to retain the spherical member of the tool set;
  wherein the inner conical surface of the pressing member is used to release the engagement of the spherical member so as to disengage the tool set from the base.

2. The universal joint as claimed in claim 1, wherein the groove of the base includes a first spring received therein.

3. The universal joint as claimed in claim 1, wherein the sliding slots of the stopping structure are formed on an inner peripheral wall of the groove of the base, and the locking tabs are attached on the spherical member of the tool set.

4. The universal joint as claimed in claim 1, wherein the engaging member is formed in a shaft shape.

5. The universal joint as claimed in claim 1, wherein the annular recesses are arranged on the outer periphery of the base to receive the engaging members, and each recess includes an engaging member placed therein.

6. The universal joint as claimed in claim 1, wherein the locking structure also includes a peripheral rib disposed on the outer periphery of the base, and includes a spring fitted on the base for biasing the pressing member against the engaging members, on another end of the pressing member is mounted a holding space, and an inner wall of the holding space contacts with one end of the spring.

7. The universal joint as claimed in claim 1, wherein on an inner wall of a holding space of the pressing member is mounted a cutout to receive a C-shaped retainer.

* * * * *